(No Model.)  2 Sheets—Sheet 1.

G. KELLY.
RUNNING GEAR FOR VEHICLES.

No. 284,640. Patented Sept. 11, 1883.

ATTEST:
George F. Dexter
A. Campbell

INVENTOR:
George Kelly
per Robert Burns
attorney (No Model.) 2 Sheets—Sheet 2.

G. KELLY.
RUNNING GEAR FOR VEHICLES.

No. 284,640. Patented Sept. 11, 1883.

ATTEST:
George F. Dexter
A. Campbell

INVENTOR:
George Kelly
per Robert Burns
Attorney.

UNITED STATES PATENT OFFICE.

GEORGE KELLY, OF CHICAGO, ILLINOIS.

RUNNING-GEAR FOR VEHICLES.

SPECIFICATION forming part of Letters Patent No. 284,640, dated September 11, 1883.

Application filed June 21, 1883. (No model.)

*To all whom it may concern:*

Be it known that I, GEORGE KELLY, a citizen of the United States, and a resident of Chicago, in the county of Cook and State of Illinois, have invented certain new and useful Improvements in Vehicles; and I do hereby declare that the following is a full, clear, and exact description of the same, reference being had to the accompanying drawings, forming a part of this specification.

My invention relates to an improved means for preventing the springing or breakage of vehicle-axles; and my improvement has for its objects, first, to provide an attachment for vehicle-axles, by the employment whereof the axle is braced and strengthened and liability to breakage in use is overcome; second, to prevent the wheel from leaving the axle in cases where the holding or axle nut has been accidentally detached. I attain these objects by the mechanism illustrated in the accompanying drawings, in which—

Figure 1:
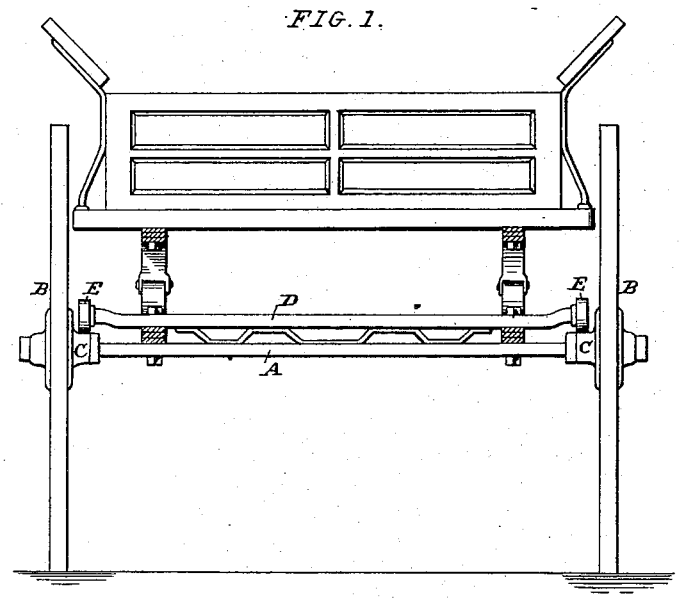
Figure 2:
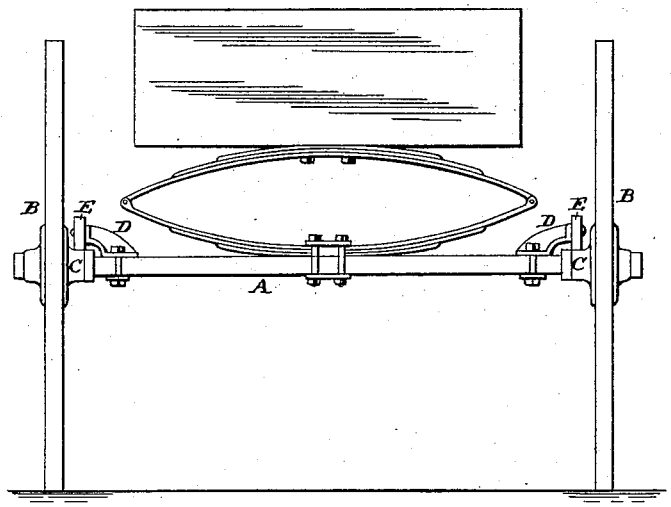
Figure 3:
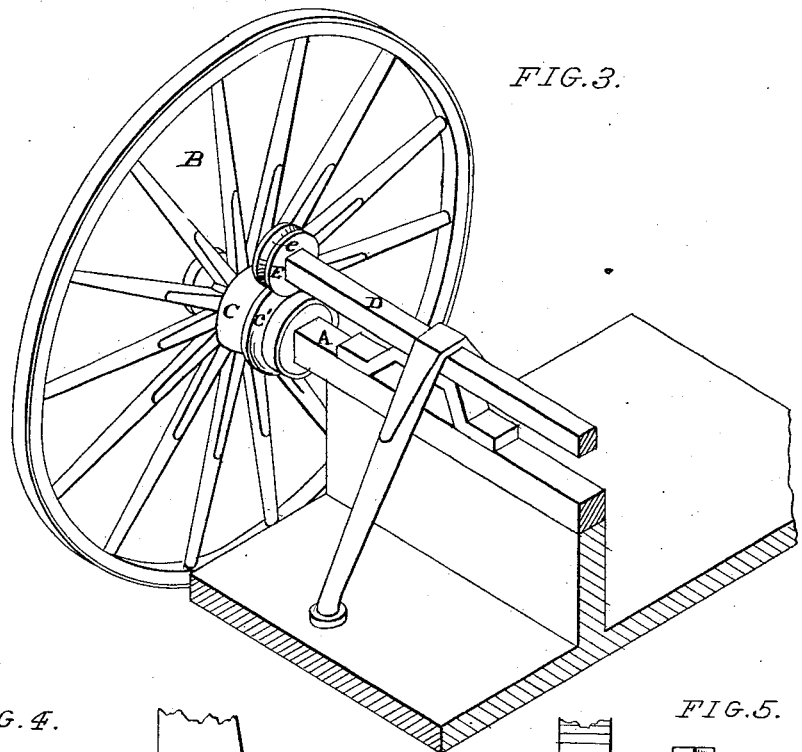
Figures 4, 5:
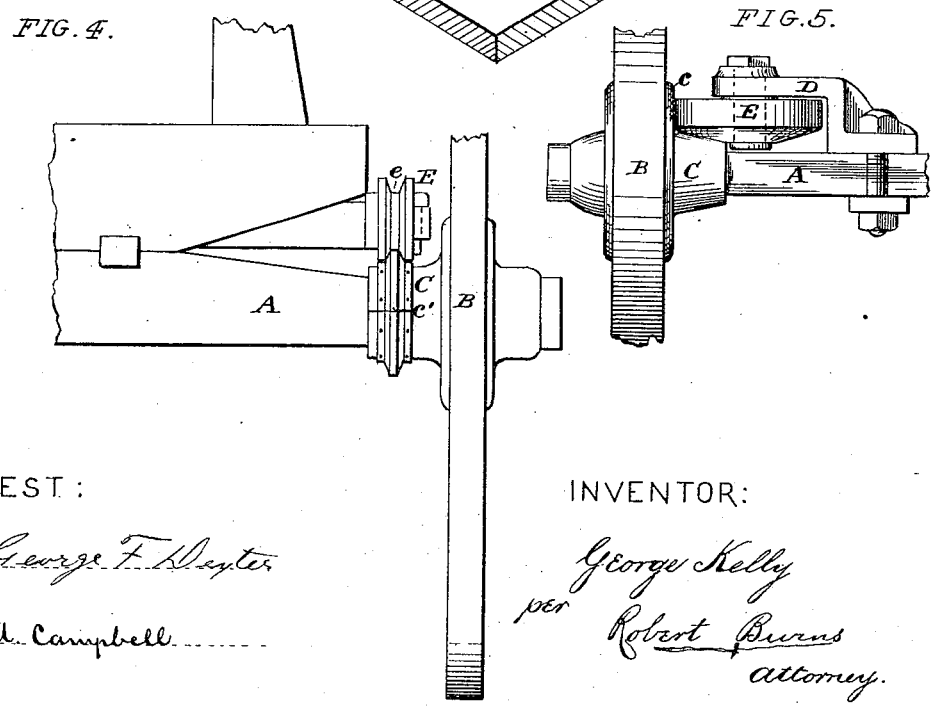

Figure 1 is an end view of a double-spring wagon, illustrating one mode of applying my improvement. Figs. 2, 4, and 5 are end views; and Fig. 3, a perspective view, showing different modes of applying my improvement.

Similar letters of reference indicate like parts in the different views.

Referring to the drawings, A represents the vehicle-axle; B, the wheels, and C the hubs thereof. D is the shaft or bracket, secured to the axle or other suitable part of the vehicle, and carrying at its outer ends wheels or rollers E, having bearings against the wheel-hubs. This wheel or roller may be arranged in a vertical plane, as indicated in Figs. 1, 2, 3, and 4, or in a horizontal plane, as indicated in Fig. 5. In the latter case the wheel or roller will have bearing against a flange, c, of the hub, and, if desired, its lower surface may be made cone-shaped, and have bearing also upon the hub part proper, as shown in the last-named figure. Either of these modes may be used, as found most desirable or convenient, without departing from the spirit of my invention. The part D may be a shaft extending from hub to hub of the vehicle, as indicated in Figs. 1 and 3, or be made in the form of a bracket, as indicated in Figs. 2 and 5. Other special forms of the part D can be used, depending upon the particular form or style of vehicle to which my improvement is applied.

It is preferred that the roller or wheel E be formed with a circumferential groove, e, so as to travel on a raised circumferential track, c', on the hub C. This track may be formed integral with the hub when the hub is made of metal; or the track may be made in sections and secured in place by screws or other equivalent means. (See Fig. 4.) The main object of this construction is to furnish means for holding the wheel in place upon the axle when from any accidental cause the holding or axle nut becomes detached.

In applying my improvement it may be arranged either at the upper or under side of the hub, or at both, as may be found most desirable.

Having thus fully described my invention, what I claim, and desire to secure by Letters Patent, is—

1. A brace for vehicle-axles, consisting of a shaft or bracket, D, carrying wheels or rollers E E, having bearing against the vehicle-wheel hub, substantially as described, and for the purpose set forth.

2. A brace for vehicle-axles, consisting of a shaft or bracket, D, and wheel or roller E, having circumferential groove e, in combination with the wheel-hub C, having circumferential track c', substantially as described, and for the purpose set forth.

3. A brace for vehicle-axles, consisting of a shaft or bracket, D, and wheel or roller E, having circumferential groove e, in combination with the wheel-hub C, having circumferential track c', made in sections and secured in place by screws or other suitable means, substantially as described, and for the purpose set forth.

In testimony whereof witness my hand this 13th day of June, 1883, at Chicago, Cook county, Illinois.

GEORGE KELLY.

In presence of—
ROBERT BURNS,
GEO. F. DEXTER.